United States Patent [19]
Estelle

[11] Patent Number: 5,642,231
[45] Date of Patent: Jun. 24, 1997

[54] COMPACT 3X ZOOM LENS

[75] Inventor: Lee R. Estelle, Rochester, N.Y.

[73] Assignee: Eastman Kodak Company, Rochester, N.Y.

[21] Appl. No.: 346,729

[22] Filed: Nov. 30, 1994

[51] Int. Cl.$^6$ ............................ G02B 15/14; G02B 3/02
[52] U.S. Cl. ............................ 359/692; 359/715
[58] Field of Search ............................ 359/692, 690, 359/689, 687, 688, 715–716

[56] References Cited

U.S. PATENT DOCUMENTS

| | | | |
|---|---|---|---|
| 4,772,106 | 9/1988 | Ogata et al. | 350/427 |
| 4,815,830 | 3/1989 | Sato et al. | 350/427 |
| 4,830,476 | 5/1989 | Aoki | 350/427 |
| 4,883,346 | 11/1989 | Aoki et al. | 350/423 |
| 4,936,661 | 6/1990 | Betensky et al. | 350/423 |
| 4,953,957 | 9/1990 | Kobayashi | 350/423 |
| 4,963,010 | 10/1990 | Kikuchi | 350/481 |
| 5,071,235 | 12/1991 | Mori et al. | 359/692 |
| 5,153,777 | 10/1992 | Okada | 359/692 |
| 5,162,947 | 11/1992 | Ito | 359/692 |
| 5,168,403 | 12/1992 | Umeda et al. | 359/692 |
| 5,218,478 | 6/1993 | Itoh | 359/692 |
| 5,268,792 | 12/1993 | Kreitzer et al. | 359/676 |
| 5,270,867 | 12/1993 | Estelle | 359/692 |
| 5,274,504 | 12/1993 | Itoh | 359/676 |
| 5,283,693 | 2/1994 | Kohno et al. | 359/691 |
| 5,327,290 | 7/1994 | Fukushima | 359/692 |
| 5,418,647 | 5/1995 | Ishikawa | 359/692 |
| 5,463,499 | 10/1995 | Ito et al. | 359/692 |

FOREIGN PATENT DOCUMENTS 4-42114  2/1992  Japan.

*Primary Examiner*—Scott J. Sugarman
*Assistant Examiner*—Jordan M. Schwartz
*Attorney, Agent, or Firm*—Svetlana Z. Short

[57] ABSTRACT

A zoom lens having two units of lens components including from the object side a positive optical unit and a negative optical unit. The zoom lens satisfies the following relationship $$\frac{eW}{eT} < 1.7$$

where eW is the principal point separation of the zoom lens when said zoom lens operates at a wide angle position and eT is the principal point separation of the zoom lens when said zoom lens operates at the telephoto position.

15 Claims, 1 Drawing Sheet

COMPACT 3X ZOOM LENS

CROSS-REFERENCE TO RELATED APPLICATIONS

This application is related to U.S. Ser. No. 08/347,612, filed concurrently herewith, entitled COMPACT ZOOM LENS WITH REDUCED ASPHERIC DECENTER SENSITIVITY, in the name of Lee R. Estelle.

BACKGROUND OF THE INVENTION

1. Field of the Invention

This invention relates to compact zoom lenses. Although the invention has general application, it is particularly usable in still photographic cameras.

2. Background Art

U.S. Pat. No. 5,270,867 to Lee R. Estelle, issued Dec. 14, 1993, described zoom lenses (also called zoom lens systems) having two units of lens components—a positive front unit and a negative rear unit. The disclosed zoom lenses utilize only three or four lens components and still achieve very good aberration correction for zoom ranges 1:2 and aperture ratios of f/8 to f/11.

U.S. Pat. No. 4,936,661 to E. I. Betensky et al., issued Jun. 26, 1990, described a zoom lens with a short back focal length and having, from front to rear, negative, positive and negative optical units. The negative unit closest to the image is movable during zooming to provide a majority of the change in focal length. In some of the examples, the front two units move as a single optical group during zooming, and in others they move relative to each other during zooming. These lenses have a short back focal length which makes them particularly useful as zoom objectives in "viewfinder" (non-SLR) cameras.

Both of the above-mentioned patent applications disclose well corrected 2× zoom lenses. However, there is an increasing need to provide consumers with a well corrected zoom lens comprised of only three to four lens elements which has an expanded zoom range such as 3× or higher. In addition, many zoom lenses of the type described above utilize aspheric surfaces. These aspheric surfaces are generally sensitive to decentration and when decentered, they usually produce image plane tilt. Thus, there is also a need for zoom lens systems with an expanded zoom range which have reduced aspheric decenter sensitivity.

SUMMARY OF THE INVENTION

It is the object of the present invention to provide a new and improved zoom lens of the type described above of simplified construction and extended zoom range.

According to the invention, these objectives are obtained by a zoom lens comprising two optical units of lens components including, from the object side, a first positive optical unit and a second negative optical unit and which zoom lens achieves zooming between a wide angle position and a narrow angle position by changing a distance between the first and the second optical units. The first optical unit includes two lens components and an aperture stop, a first lens component positioned on the object side of said first optical unit, the first lens component having at least one aspheric surface, and a second positive lens component positioned on the image side of said first lens component. The second optical unit has negative optical power and contains no more than two lens elements. The zoom lens satisfies the following:

$$\frac{eW}{eT} < 1.7$$

where eW is the principal point separation of the zoom lens when said zoom lens operates at a wide angle position and eT is the principal point separation of the zoom lens when said zoom lens operates at the telephoto position.

According to one aspect of the invention, a zoom lens has aspheric surfaces characterized by asphericity difference $\Delta$ such that the zoom lens has reduced aspheric decenter sensitivity.

With this invention, well corrected zoom lenses are obtained with a zoom range of about 3 to 1 using few lens elements.

BRIEF DESCRIPTION OF THE DRAWINGS

In the detailed description of the preferred embodiment of the invention presented below, reference is made to the accompanying drawing in which.

DESCRIPTION OF THE PREFERRED EMBODIMENT

Figure 1:
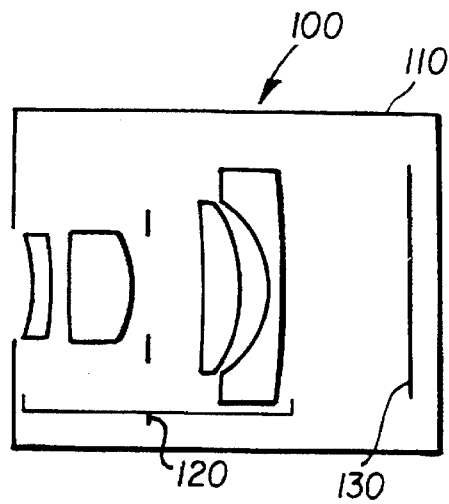
FIG. 1 is a simplified schematic side section of a photographic camera 100 including a zoom lens system 120.
Figure 2:
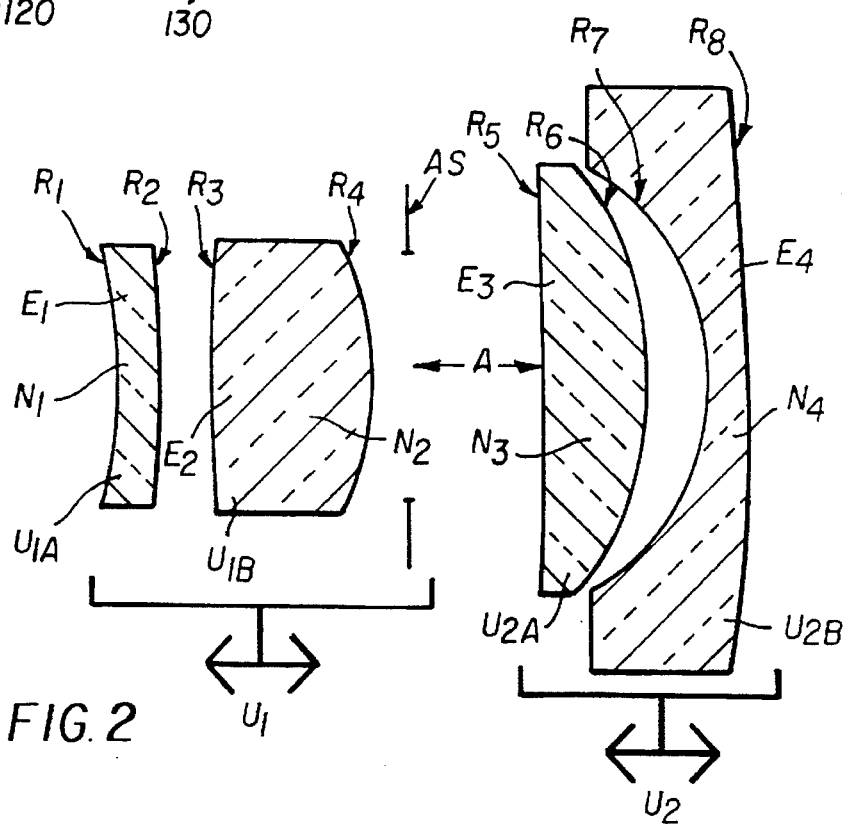
FIG. 2 is a schematic cross-sectional view of a zoom lens 120 constructed according to a preferred embodiment of the present invention.

Referring to FIG. 1, there is shown a camera 100 including a zoom lens 120. The camera 100 includes a camera housing 110 in which photographic film 130 is supported in a suitable location so that an image is produced by the zoom lens 120 on the film. Camera 100 includes other known structures or means for advancing the film and a shutter for enabling an exposure of the film to capture an image of a scene to be photographed. The preferred embodiment of the zoom lens according to the invention is shown in FIG. 2 and is illustrated by an example set forth in Table 1. In the drawing, the surfaces R of the zoom lens 120 are numbered by subscripts from the front or object side of the lens to the rear or image side of the lens. The thickness of the lens elements and the spacings between lens elements, including the zooming space A, are located from front to rear (i.e., object to image). In the table, surfaces and thicknesses are listed on the same line as the surface preceding the thickness or spacing as the case may be. All indexes of refraction $N_e$ are for the green mercury e line of the spectrum at a wavelength $\lambda_e$ of 5461 Å. V is the Abbe number of the lens elements.

This embodiment contains two optical units, specified as $U_1$ and $U_2$ in the drawing. Lens components $U_{1A}$ and $U_{1B}$ make up the first optical unit $U_1$, and lens components $U_{2A}$ and $U_{2B}$ make up the second optical unit $U_2$.

Lens component $U_{1A}$ of the preferred embodiment is a weak lens component. By "weak" it is meant that the power of a lens component $U_{1A}$ or the lens element $E_1$ is smaller than the power of the zoom lens in the wide angle mode so that the absolute value of the ratio of power, $K_{1A}$, of the lens component $U_{1A}$ to the power, $K_w$, of the zoom lens system in the wide angle mode is about 0.6 or less or $$\left| \frac{K_{1A}}{K_w} \right| \leq 0.6.$$

This ratio in the preferred embodiment of the invention is 0.56.

In this embodiment, the power of the front-most lens component $U_{1A}$ is negative and this lens component is a single meniscus lens element $E_1$ that has its concave surface oriented towards the object space. It is preferred that the frontmost lens element has one, and more preferably, two aspheric surfaces. Accordingly, in this embodiment both surfaces of lens element $E_1$ are aspheric.

The second lens component $U_{1B}$, of the first optical unit $U_1$, is positive. It is contemplated that it may contain one or more lens elements. In this embodiment, it is a single positive lens element $E_2$ which is biconvex. It is preferred that the ratio of the focal length $f_{1B}$ of the second lens component $U_{1B}$ to the focal length $f_{1A}$ of the first lens component $U_{1A}$ be about equal to or less than 0.4. That is $$\left| \frac{f_{1B}}{f_{1A}} \right| = \left| \frac{K_{1A}}{K_{1B}} \right| \leq 0.4$$

where $K_{1A}$ is the power of the first optical component $U_{1A}$ and $K_{1B}$ is the power of the second optical component $U_{1B}$. It is even more preferable that this ratio it be less than 0.35. In this embodiment $$\left| \frac{K_{1A}}{K_{1B}} \right| = 0.32.$$

It should be noted that the stronger the front lens element, the more sensitive the optical system would be to the decenter of this lens element. That is, if the lens component $U_{1A}$ (or the lens element $E_1$) does not satisfy the above power ratio inequalities the zoom lens 120 is more likely to become sensitive to tilt or decenter. Additional conditions for minimizing aspheric decenter sensitivity will be discussed further down in the specification.

The index of refraction $N_1$ of the first lens element $E_1$ can be equal to or greater than 1.65. The index of refraction $N_2$ of the second lens element $E_2$ can be equal to or greater than 1.52. Despite the fact that the indices of the first two lens elements are larger than 1.65 and 1.52, we do not have a petzval problem or large astigmatism.

The aperture stop AS is positioned behind the second lens component $U_{1B}$.

The second optical unit $U_2$ is negative in power. Its movement provides most of the change in focal length of the lens during zooming. In this embodiment the optical unit $U_2$ consists of a first positive lens component $U_{2A}$ corresponding to lens element $E_3$ and a second negative lens component $U_{2B}$ corresponding to lens element $E_4$. Furthermore, in this embodiment, each of these lens components is a singlet.

The negative power of the front lens element $E_1$ helps create an inverted telephoto effect of the front positive group. This effect creates more space between two zooming groups (or optical units) $U_1$ and $U_2$ and helps to expand a zooming range to 3× or more. The overall zoom lens system of the preferred embodiment tends toward a telephoto-type system which facilitates net compactness, and in fact, at the long focal length mode, it is truly a telephoto lens with a 0.95 telephoto ratio.

Furthermore, when eW is defined as the nodal point separation when the zoom lens operates at the wide angle position and when eT is defined as the nodal point separation when the zoom lens operates at the telephoto position, the preferred value for the ratio eW/eT is about equal to or less than 1.7. This value for eW/eT helps to maintain the large zoom ratio such as 3×, for example. If this ratio is allowed to become significantly larger than 1.7, the airspace A becomes too small to achieve the large zoom range and, in addition, the location of the aperture stop AS and the location of the third lens component $U_{2A}$ interfere with each other.

Note that the zoom lens of the preferred embodiment is corrected across a zoom range of 3× with an effective aperture that varies from approximately F/6.3 to F/9.3. This range of relative apertures for a 3× four element zoom lens suitable as an objective or taking lens for a 35 mm camera is quite remarkable.

Table 1 provides specific parameters for the preferred embodiment illustrated in FIG. 1. The accompanying notes 1–3 provide further parameters as well as MTF values for the zoom lens of the preferred embodiment.

TABLE 1

| SURF | CLEAR APER. | AXIAL BEAM | RADIUS | THICKNESS | INDEX AND V NUMBER |
|---|---|---|---|---|---|
| 1 | 9.52 | 8.33 | ASPHERE | 1.660 | 1.844 23.8 |
| 2 | 8.80* | 8.75 | ASPHERE | 1.736 | |
| 3 | 9.37 | 9.37 | 66.4470 | 5.892 | 1.552 63.5 |
| 4 | 9.98 | 9.97 | −10.5410 | 1.327 | |
|   | 8.90 | 8.90 | DIAPHRAGM | A | |
| 5 | 14.79 | 8.25 | ASPHERE | 3.517 | 1.590 30.9 |
| 6 | 15.61 | 7.55 | ASPHERE | 2.412 | |
| 7 | 15.50 | 5.91 | −8.99500 | 1.254 | 1.804 39.6 |
| 8 | 21.22* | 5.85 | −99.5818 | | |

*DO NOT EXCEED

| EF | BF | FF | BEST FOCUS | A | N.P. LOC. | N.P. DIAM. | X.P. LOC. | X.P. DIAM. |
|---|---|---|---|---|---|---|---|---|
| 28.97 | 7.99 | 43.43 | −.09 | 10.567 | 6.74 | 4.28 | −8.74 | 2.47 |
| 47.47 | 25.63 | 62.83 | −.50 | 5.048 | 6.74 | 6.07 | −6.75 | 4.14 |
| 77.49 | 54.27 | 94.30 | +.11 | 1.700 | 6.74 | 8.50 | 5.16 | 6.52 |

TABLE 1-continued

| EF | LENS LENGTH | STOP DIAM. | REL. APER. | REL. ILLUM. | COVERAGE (Half Angle) |
|---|---|---|---|---|---|
| 28.97 | 28.365 | 4.48 | 6.80 | .24 | 36.6° |
| 47.47 | 22.846 | 6.35 | 7.90 | .47 | 24.3° |
| 77.49 | 19.498 | 8.90 | 9.30 | .68 | 15.6° |

NOTES:
1. ASPHERIC EQUATION:

$$X = \frac{CY^2}{1 + \sqrt{1 - (k+1)C^2Y^2}} + DY^4 + EY^6 + FY^8 + GY^{10}$$

| SURF. 1 | C = -0.0509762 | D = -0.2141500E-03 | E = 0.1045400E-04 |
|---|---|---|---|
| | k = 0.0000000 | F = -0.3043000E-06 | G = 0.4268700E-08 |
| SURF. 2 | C = -0.0274527 | D = -0.4458200E-04 | E = 0.1198700E-04 |
| | k = 0.0000000 | F = -0.3061900E-06 | G = 0.5166000E-08 |
| SURF. 5 | C = -0.0136101 | D = 0.1921700E-04 | E = 0.3149300E-06 |
| | k = 0.0000000 | F = 0.7225300E-08 | G = -0.1619300E-09 |
| SURF. 6 | D = -0.0580744 | D = 0.0000000E+00 | E = 0.0000000E+00 |
| | k = 3.0955000 | F = 0.0000000E+00 | G = 0.0000000E+00 |

| 2. | SURFACES | EF | BF | FF |
|---|---|---|---|---|
| | 1-4 | 20.74 | 23.04 | 13.06 |
| | 5-8 | -19.78 | -19.65 | -25.30 |

3. MTF DATA AT BEST FOCUS USING WAVELENGTHS 546.1, 486.1, AND 656.3 WITH RESPECTIVE WEIGHTS .5, .15, .35:

| | | | PER CENT FIELD (SAGITTAL/TANGENTIAL) | | | | | |
|---|---|---|---|---|---|---|---|---|
| EF | L/MM | AXIS | 40% | 60% | 75% | 90% | AWA |
| 28.97 | 20 | 77 | 71/51 | 74/59 | 80/70 | 30/28 | 65.2 |
| 28.97 | 5 | 96 | 96/93 | 96/93 | 97/94 | 91/85 | 94.4 |
| 47.47 | 20 | 76 | 71/57 | 72/51 | 76/70 | 66/32 | 65.3 |
| 47.47 | 5 | 96 | 96/93 | 96/92 | 96/95 | 95/88 | 94.5 |
| 77.49 | 20 | 70 | 64/63 | 62/65 | 59/58 | 51/28 | 61.6 |
| 77.49 | 5 | 95 | 94/94 | 93/94 | 93/93 | 90/87 | 93.3 |

This embodiment has another very important property—it can be manufactured with relative ease due to a designed decrease of the aspheric decenter sensitivity. Since the sensitivity to aspheric decentering is reduced to a tolerable level, the centering of the lens components $U_{1B}$ and $U_{2B}$ (corresponding to lens elements $E_2$ and $E_4$, respectively) can be achieved by normal manufacturing assembly without micro-manipulating the lens components or lens elements in their mount. Decenter sensitivity needs to be reduced because decentering a sensitive lens element with an aspheric surface introduces an image plane tilt (as well as other aberrations)—which is obviously very undesirable.

The preferred embodiment described above incorporates four aspheric surfaces on two lens elements to achieve the large focal length range and maintain the required high quality. These aspheres exhibit special characteristics that make them unique to the manufacturing process. They have greatly decreased decenter sensitivity.

The first element $E_1$ is a negative meniscus biasphere with the surfaces bent away from the image plane. It is found that sensitivity of the first surface, which is an aspheric surface (of the first lens element $E_1$) to aberrations such as spherical aberration, astigmatism and coma is reduced when $$|DH^3| \geq 16$$

where D is the fourth order aspheric coefficient and H is the size of the image diagonal covered by the lens. In this embodiment, $$|DH^3| = 17.2$$

Figure 3:
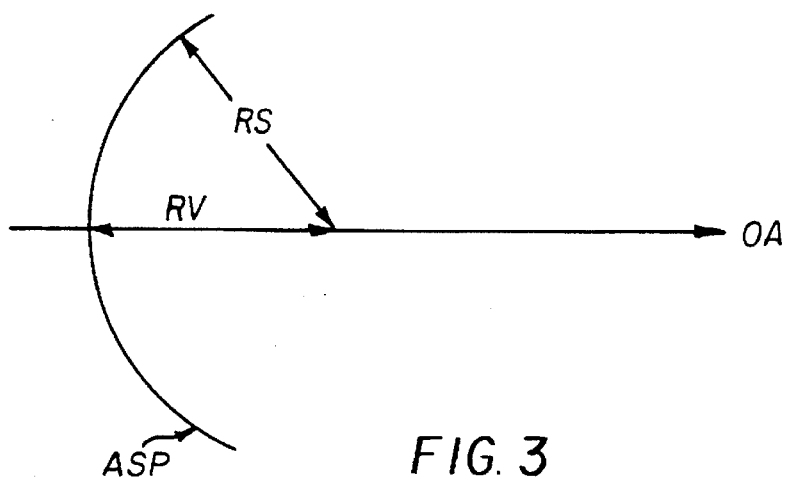
FIG. 3 is a schematic drawing showing how to measure an amount of aspheric difference $\Delta$ on a surface of a lens element of the zoom lens 120 illustrated in FIG. 2.

Alternatively, or in addition, in order to reduce aspheric decenter sensitivity of any surface in an aspheric lens element, such as the front lens element $E_1$, the designer's goal should be to reduce the amount of asphericity difference Δ from best fit sphere to the most minimal value without compromising the image quality. In addition, reducing Δ enhances the manufacturability of the surface, i.e. the surface becomes easier to test and less material has to be removed from the best fit sphere. If this is not done, decentering of a sensitive aspheric element is likely to create a large amount of image plane tilt. As shown in FIG. 3, we define the radius (RS) of the best fit sphere by constructing a perpendicular to the slope of the aspheric surface ASP at the clear aperture, the numerical value for RS is computed by measuring the distance to the point where that perpendicular intersects the optical axis OA. The distance from that point of intersection to the vertex of the aspheric surface is RV. The difference of RS and RV is a measurement of asphericity. The asphericity difference is defined as:

$$\Delta = (|RV| - |RS|)/\lambda$$

where λ is the wavelength of the light used to measure the difference (usually 0.00066 mm), can be used to measure the amount of aspheric departure from a best fit sphere in wavelengths of light. (Care must be taken not to allow inflection points to be present at smaller apertures than the clear apertures.) The larger is Δ, the more it effects aberrations. As Δ becomes smaller, the less sensitive is the surface to aspheric decentering. Hence, the lens component or lens element becomes less sensitive to aspheric decentering, especially image surface tilt. It is preferred that Δ for surface 1 be <50 waves; Δ for surface 2 be <250 waves; and Δ for front surface of element 3 be <100 waves. With this definition, the amount of waves of departure for the first lens element $E_1$, surfaces 1 and 2 are less than 20 waves and 128 waves, respectively. And at the first surface of the third lens component Δ is less than 41 waves. Obviously, if the aspheric surfaces were reduced to spherical surfaces, the differences would be zero, but the benefit of aspheric profile for correcting lens aberrations will be lost as well. However, given the large asphericity of surface 2 of the first lens element $E_1$, the sensitivity to decenters of this surface is about equal to the sensitivity of surface 1 of this element. More importantly, when these surfaces are modeled for aspheric decentering sensitivity, they are found to be within normal manufacturing capabilities.

This invention has been described in detail with particular reference to a preferred embodiment thereof, but it will be understood that variations and modifications can be effected within the spirit and scope of the invention as described hereinabove and as defined in the appended claims. For example, the single front lens elements forming lens component $U_{1B}$ could be divided into two or more very weak lens elements. Although such minor changes are within the scope of the invention, they would detract from its simplicity. Thus, a two lens element first unit is preferred. Similarly, it may be possible to reduce the second lens unit to a single negative lens component or lens element by eliminating the positive lens element. However, this change would make it harder to achieve an expanded zoom ratio such as 3×. Nevertheless, such changes are within the scope of the invention.

What is claimed is:

1. A zoom lens comprising:
   a first positive optical unit and a second negative optical unit and which zoom lens achieves zooming between a wide angle position and a narrow angle position by changing a distance between said first and said second optical units;
   said first optical unit including two lens components and an aperture stop, a first lens component positioned on the object side of said first optical unit, said first lens component having at least one aspheric surface and a second positive lens component positioned on the image side of said first lens component;
   said second optical unit having negative optical power and containing no more than two lens elements; and
   said zoom lens satisfying the following:

$$\frac{eW}{eT} \leq 1.7 \text{ and } \frac{f_t}{f_w} \geq 2.7$$

where eW is the principal point separation of the zoom lens when said zoom lens operates at a wide angle position and eT is the principal point separation of the zoom lens when said zoom lens operates at the telephoto position, $f_t$ is the focal length of the zoom lens at the telephoto position and $f_w$ is the focal length of the zoom lens at the wide angle position.

2. A zoom lens according to claim 1, wherein said second optical unit consists of a first positive lens element and a second negative lens element.

3. A zoom lens according to claim 1, wherein said first lens component has an index of refraction $N_1$ equal to or greater than 1.65 and wherein said second positive lens component has an index of refraction $N_2$ equal to or greater than 1.52.

4. A zoom lens according to claim 2, wherein said first lens component has an index of refraction $N_1$ equal to or greater than 1.65 and wherein said second positive lens component has an index of refraction $N_2$ equal to or greater than 1.52.

5. A zoom lens according to claim 1, wherein $$\frac{f_t}{f_w} \geq 2.7.$$

6. A zoom lens according to claim 1, which has four aspheric surfaces on two lens elements.

7. A zoom lens according to claim 1, wherein the frontmost lens element of said first lens unit is a negative lens element having a concave object side surface.

8. A zoom lens according to claim 2, wherein the frontmost lens element of said first lens unit is a negative lens element having a concave object side surface.

9. A zoom lens according to claim 1, wherein $$\Delta_{1f} < 50\lambda$$

$$\Delta_{1b} < 250\lambda$$

$$\Delta_{3f} < 100\lambda$$

where $\Delta_{1f}$ is the asphericity difference at the front surface of the first lens element, $\Delta_{1b}$ is the asphericity difference at the back surface of the first lens element, $\Delta_{3f}$ is the asphericity difference at the front surface of the third lens element, and λ is the wavelength of the light used to measure the difference.

10. A zoom lens according to claim 2, wherein the value Δ for the surface is $$\Delta_{1f} < 50\lambda$$

$$\Delta_{1b} < 250\lambda$$

$$\Delta_{3f} < 100\lambda,$$

where $\Delta_{1f}$ is the asphericity difference at the front surface of the first lens element, $\Delta_{1b}$ is the asphericity difference at the back surface of the first lens element, $\Delta_{3f}$ is the asphericity difference at the front surface of the third lens element, and λ is the wavelength of the light used to measure the difference.

11. A zoom lens according to claim 7, wherein the value Δ for the surface is $$\Delta_{1f} < 50\lambda$$

$$\Delta_{1b} < 250\lambda$$

$$\Delta_{3f} < 100\lambda,$$

where $\Delta_{1f}$ is the asphericity difference at the front surface of the first lens element, $\Delta_{1b}$ is the asphericity difference at the back surface of the first lens element, $\Delta_{3f}$ is the asphericity difference at the front surface of the third lens element, and λ is the wavelength of the light used to measure the difference.

12. A zoom lens according to claim 1 further having the following parameters

| SURF. | CLEAR APER. | AXIAL BEAM | RADIUS | THICKNESS | INDEX AND V NUMBER |
|---|---|---|---|---|---|
| 1 | 9.52 | 8.33 | ASPHERE | 1.660 | 1.844 23.8 |
| 2 | 8.80 | 8.75 | ASPHERE | 1.736 | |
| 3 | 9.37 | 9.37 | 66.4470 | 5.892 | 1.552 63.5 |
| 4 | 9.98 | 9.97 | −10.5410 | 1.327 | |
| | 8.90 | 8.90 | DIAPHRAGM | A | |
| 5 | 14.79 | 8.25 | ASPHERE | 3.517 | 1.590 30.9 |
| 6 | 15.61 | 7.55 | ASPHERE | 2.412 | |
| 7 | 15.50 | 5.91 | −8.99500 | 1.254 | 1.804 39.6 |
| 8 | 21.22 | 5.85 | −99.5818 | | |

1. ASPHERIC EQUATION:

$$X = \frac{CY^2}{1 + \sqrt{1 - (k+1)C^2Y^2}} + DY^4 + EY^6 + FY^8 + GY^{10}$$

SURF. 1  C = −0.0509762   D = −0.2141500E−03   E = 0.1045400E−04
         k = 0.0000000    F = −0.3043000E−06   G = 0.4268700E−08
SURF. 2  C = −0.0274527   D = −0.4458200E−04   E = 0.1198700E−04
         k = 0.0000000    F = −0.3061900E−06   G = 0.5166000E−08
SURF. 5  C = −0.0136101   D = 0.1921700E−04    E = 0.3149300E−06
         k = 0.0000000    F = 0.7225300E−08    G = −0.1619600E−09
SURF. 6  D = −0.0580744   D = 0.0000000E+00    E = 0.0000000E+00
         k = 3.0955000    F = 0.0000000E+00    G = 0.0000000E+00

13. A zoom lens comprising from object side: a first lens element having negative optical power and a second lens element having positive optical power forming a first optical unit of overall positive optical power; a third lens element of positive optical power and a fourth lens element of negative optical power forming a second optical unit of negative optical power; an aperture stop located between said second lens element and a third lens element, said zoom lens achieves zooming between a wide angle position and a narrow angle position by changing a distance between said first and said second optical units, and wherein said zoom lens satisfies the following parameter ratios $$\frac{eW}{eT} \leq 1.7 \text{ and } \frac{f_t}{f_w} \geq 2.7$$

where eW is the principal point separation of the zoom lens when said zoom lens operates at the wide angle position and eT is the principal point separation of the zoom lens when the zoom lens operates at the telephoto position, $f_t$ is the focal length of the zoom lens at the telephoto position and $f_W$ is the focal length of the zoom lens at the wide angle position.

14. A zoom lens according to claim 13, wherein the value Δ for the surface is $\Delta_{1f} < 50\lambda$ $\Delta_{1b} < 250\lambda$ $\Delta_{3f} < 100\lambda$ where $\Delta_{1f}$ is the asphericity difference at the front surface of the first lens element, $\Delta_{1b}$ is the asphericity difference at the back surface of the first lens element, $\Delta_{3f}$ is the asphericity difference at the front surface of the third lens element, and λ is the wavelength of the light used to measure the difference.

15. A camera comprising:

a) a camera body;

b) film contained in said camera body;

c) a zoom lens including two optical units of lens components including, from the object side, a first positive optical unit and a second negative optical unit and which zoom lens achieves zooming between a wide angle position and a narrow angle position by changing a distance between said first and said second optical units;

said first optical unit including two lens components and an aperture stop, a first lens component positioned on the object side of said first optical unit, said first lens component having at least one aspheric surface and a second positive lens component positioned on the image side of said first lens component;

said second optical unit having negative optical power and containing no more than two lens elements, said zoom lens satisfying the following:

$$\frac{eW}{eT} \leq 1.7 \text{ and } \frac{f_t}{f_w} \geq 2.7$$

where eW is the principal point separation of the zoom lens when said zoom lens operates at a wide angle position and eT is the principal point separation of the zoom lens when said zoom lens operates at the telephoto position.

* * * * *

UNITED STATES PATENT AND TRADEMARK OFFICE
CERTIFICATE OF CORRECTION

PATENT NO. : 5,642,231
DATED : June 24, 1997
INVENTOR(S) : Lee R. Estelle

It is certified that error appears in the above-identified patent and that said Letters Patent is hereby corrected as shown below:

Column 9, Line 21    delete "G=-0.1619600E-09" replace with-- G= -0.1619300E-09--

Signed and Sealed this

Twenty-third Day of December, 1997

Attest:

BRUCE LEHMAN

Attesting Officer      Commissioner of Patents and Trademarks